United States Patent [19]

Albee et al.

[11] Patent Number: 4,603,172

[45] Date of Patent: Jul. 29, 1986

[54] LOW MOLECULAR WEIGHT COPOLYMER SALTS AS DISPERSION AIDS IN PLASTICS

[75] Inventors: Paul J. Albee, Bensalem, Pa.; Patricia E. Burdick, Budd Lake, N.J.; Christopher J. Auger, Tervuren, Belgium

[73] Assignee: Allied Corporation, Morris Township, Morris County, N.J.

[21] Appl. No.: 790,754

[22] Filed: Oct. 22, 1985

Related U.S. Application Data

[63] Continuation of Ser. No. 305,671, Sep. 25, 1981, abandoned.

[51] Int. Cl.$^4$ ............................................. C08L 33/02
[52] U.S. Cl. .................................... 525/143; 525/176; 525/183; 525/221
[58] Field of Search ................. 525/143, 176, 183, 221

[56] References Cited

U.S. PATENT DOCUMENTS

| 3,264,272 | 8/1966 | Rees . | |
|---|---|---|---|
| 3,347,957 | 10/1967 | Adomaitis et al. . | |
| 3,365,520 | 1/1968 | Foster | 525/221 |
| 3,410,928 | 11/1968 | Baum | 525/221 |
| 3,437,718 | 4/1969 | Rees . | |
| 3,472,825 | 10/1969 | Walter | 526/240 |
| 3,492,367 | 1/1970 | Starkweather | 526/317 |
| 3,658,741 | 4/1972 | Knutson | 526/88 |
| 4,412,040 | 10/1983 | Albee | 525/143 |

Primary Examiner—Paul R. Michl
Attorney, Agent, or Firm—Richard A. Negin; Patrick L. Henry; Richard A. Anderson

[57] ABSTRACT

A dispersion aid for polymers comprising a copolymer salt of a low molecular weight copolymer acid of an alpha-olefin and an alpha,beta-ethylenically unsaturated carboxylic acid, a composition containing the lubricant, and a method for processing polymers containing the dispersion aid.

46 Claims, 2 Drawing Figures

LOW MOLECULAR WEIGHT COPOLYMER SALTS AS DISPERSION AIDS IN PLASTICS

This application is a continuation of application Ser. No. 305,671 filed Sept. 25, 1981, now abandoned.

BACKGROUND OF THE INVENTION

This invention relates to dispersion aids for polymers; more particularly this invention relates to dispersion aids for polymers made from polymer salts of low molecular weight, copolymers of alpha-olefins and alpha,beta-ethylenically unsaturated carboxylic acid.

It is known in the art to use ionic copolymer additives in various polymers to improve properties. The ionic copolymers disclosed in the art are made from copolymers of alpha-olefins and alpha,beta-ethylenically unsaturated carboxylic acid. However, these copolymers are generally of higher molecular weights and are used to improve polymer properties unrelated to processing and improved pigment dispersion such as impact resistance. Examples of these are U.S. Pat. Nos. 3,264,272 and 3,404,134, 3,347,957 and 4,210,579. The high molecular weight of the copolymer acids used to make the ionic copolymers are reflected by the fact that these higher molecular weight copolymers have measurable melt indexes, and that they can be processed by milling.

Low molecular weight copolymer salts are disclosed in U.S. Ser. No. 219,144 filed Dec. 22, 1980, now abandoned. These salts have been found to be useful as polymer lubricants in U.S. Ser. No. 222,197 filed Jan. 2, 1981, now U.S. Pat. No. 4,412,040. Low molecular polyethylene homopolymers have been used as disperson aids in polymers in which they are compatible. However, low molecular weight homopolymers can not be used as dispersion aids in nylon, polystyrene, polycarbonates, polyester due to incompatibility.

SUMMARY OF THE INVENTION

In accordance with this invention, a dispersion aid for polymers has been found which comprises a copolymer salt of a low molecular weight copolymer acid of an alpha-olefin and an alpha,beta-ethylenically unsaturated carboxylic acid. The copolymer acid has a molecular weight from about 500 to about 20,000, preferably 1,000 to 6,000. The copolymer acid is neutralized up to about 100%, and preferably from 15% to 60%, with at least one cation from the group consisting of metal cations from Groups IA, IIA, IIB, IIIA and the transition elements of the Periodic Table of Elements, with Group IIA and IIB metals preferred. The dispersion aid has a Brookfield viscosity at 140° C. of from 10,000 to 250,000 and preferably 30,000 to 50,000 centerpoises, and a hardness less than 12 dmm, preferably less than 4 dmm, and most preferably less than 0.1 dmm as measured on the ASTM D-5 test. The dispersion aid of the present invention is useful in a method to process polymers.

Preferably, the polymer dispersion aid can be made of a salt of a copolymer acid of ethylene and an alpha,beta-ethylenically unsaturated carboxylic acid having 3 to 6 carbon atoms such as acrylic acid. The ethylene and acrylic acid copolymer preferably has an acid number between about 40 and 160. The acid number is measured by milligrams of potassium hydroxide necessary to neutralize one gram of the polymer acid.

The dispersion aid of the present invention can be used to disperse finely divided inert material such as pigment in polymer compositions with a variety of polymers. Two particular polymers exemplifying the fact that the dispersion aid of the present invention can be used with diverse polymers are polyolefins, such as polypropylene, and polymers of the styrene family, such as polystyrene.

Further objects, features and advantages of the present invention will become apparent by reference to the following figures and specification.

DETAILED DESCRIPTION OF THE INVENTION

Figure 1:
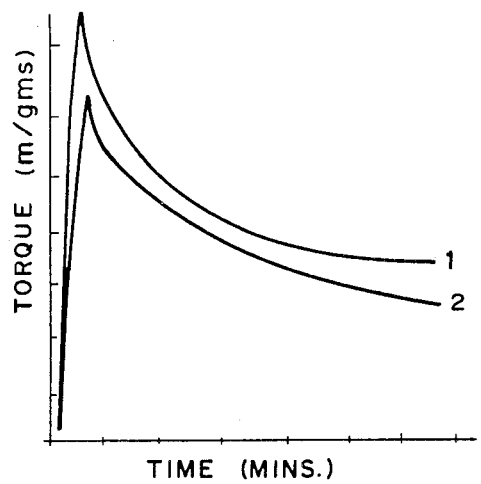
FIGS. 1 and 2 are graphs of Torque v. Time for blends mixed in a Brabender Mixing Bowl.

The present invention is a dispersion aid for polymers. The dispersion aid is based on a low molecular weight copolymer acid. The copolymer acid is a copolymer of an alpha-olefin and an alpha,beta-ethylenically unsaturated carboxylic acid. The alpha,beta-ethylenically unsaturated carboxylic acid can be a monocarboxylic acid, or have more than one carboxylic group attached to it. The molecular weight of the copolymer acid is from about 500 to about 20,000, preferably from about 1,000 to 15,000, more preferably from about 1,000 to about 6,000, and most preferably from about 1,000 to about 3,500. The dispersion aid is a salt of the copolymer acid. The acid is neutralized with at least one cation from the group consisting of metallic cations having a valence of 1 to 3.

The alpha,beta-ethylenically unsaturated carboxylic acids which can be copolymerized with the alpha-olefin preferably have 3 to 8 carbon atoms. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

The alpha-olefin is preferably ethylene. The concentration of the ethylene in the copolymer is at least 50 mol percent, and preferably above 80 mol percent.

A preferred copolymer acid is a copolymer of ethylene and an alpha,beta-ethylenically unsaturated monocarboxylic acid having 3 to 6 carbon atoms. A most preferred alpha,beta-ethylenically unsaturated monocarboxylic acid is acrylic acid. The ethylene acrylic acid copolymer has an acid number in the range from about 1 to about 180, with an acid number from about 40 to 160 being preferred, and an acid number from about 40 to 120 being most preferred. The acid number is determined by the number of milligrams of potassium hydroxide necessary to neutralize one gram of copolymer acid. The molecular weight of the ethylene acrylic acid copolymer is from about 500 to about 20,000, preferably from about 1,000 to 15,000, more preferably from 1,000 to 6,000, and most preferably from 1,000 to 3,500. Table I below characterizes preferred ethylene acrylic acid copolymers.

TABLE I

| Copolymer Acid | Softening Pt. (ASTM E-28) °C. | Softening Pt. (ASTM E-28) °F. | Hardness dmm (ASTM D-5) | Density g/cc (ASTM D-1505) | Brookfield Viscosity @ 140° C. cps | Acid No. mg KOH/g | wt. % Acrylic Acid |
|---|---|---|---|---|---|---|---|
| A | 108 | 226 | 2.0 | 0.93 | 500 | 40 | 5 |
| B | 102 | 215 | 4.0 | 0.93 | 650 | 80 | 10 |
| C | 92 | 198 | 11.5 | 0.93 | 650 | 120 | 15 |

The low molecular copolymer acids used to make the copolymer salts of the present invention can be prepared by any suitable process known in the art. An example method is described in U.S. Pat. No. 3,658,741, which is incorporated herein by reference.

Cations having valences of 1 to 3 can be used to neutralize the copolymer acid. Preferably, metallic cations are derived from a group of metals which can be chosen from Groups IA, IIA, IIIA and the transition elements of the Periodic Table of Elements to be used in this process. Metal cations which are preferred are sodium, potassium, magnesium, calcium, barium, zinc and aluminum cations, with calcium cations being most preferred. Cation containing materials can be metal salts including: oxides, hydroxides, acetates, methoxides, oxylates, nitrates, carbonates and bicarbonates. The copolymer acid can be neutralized up to 100%; however, it is preferred to neutralize the copolymer acid to from 15 to 60 percent, and more preferably from 25 to 50 percent neutralization of the carboxylic acid groups using the process of the present invention.

The dispersion aid has a Brookfield viscosity at 140° C. of from 10,000 to 250,000 centerpoises, and preferably from 30,000 to 50,000 centerpoises; and a hardness of less than 12 dmm preferably less than 4 dmm, and most preferably less than 0.1 dmm as measured on the ASTM D-5 test.

The most preferred dispersion aid is copolymer acid B of Table I neutralized to between about 15 and about 60 percent, and preferably 40 to 50 percent, with a calcium cation. A preferred cation containing material is calcium hydroxide. This copolymer salt is compatible with the polymer being processed and has a low enough viscosity for maximum pigment wetting. The viscosity and softening point of the copolymer salt of copolymer acid B are low enough to develop maximum dispersion of the pigment through the polymer without overlubrication of the polymer.

The dispersion aid of the present invention is useful in dispersing finely divided inert materials in polymers. For the purpose of the present invention an inert material is one that does not melt at the melting temperature of the polymer. Generally, the average diameter of material to be dispersed is less than 100 microns in diameter, and usually the diameter is less than 50 microns.

Classes of materials which can be dispersed with the dispersion aid of the present invention include: inorganic, organic, natural and synthetic pigments; lake dyes; less soluble dyes; fillers; flame retarders; antioxidants; stabilzers; and the like.

Typical pigments include: titanium dioxide, zinc oxide; calcium carbonate; barite, silica and china clay; lead white; carbon black; red lead; chromate pigments; Venetian Red; Prussian blue; chromic oxide; chrome green; copper blue, and cobalt blue. Typical lake dyes include: alumina dyed with a solution of natural organic color; and coal tar colors precipitated from solution of various coal tar dyes by means of a metallic salt, tannin or other suitable reagent.

Typically, fillers may be selected from a wide variety of minerals, metals, metal oxides, siliceous materials, metal salts, and materials thereof. Example of fillers include glass fibers, alumina, feldspar, asbestos, talc, calcium carbonates, clay, carbon black, quartz, novaculite and other forms of silica, kaolinite, bentonite, garnet, mica, saponite, beidellite, etc. The foregoing recited fillers are illustrative only and are not meant to limit the scope of the fillers that can be utilized in this invention.

There can be from 0.1 to 100 parts of the material to be dispersed. Preferably there is 0.1 to 50 parts of the material per hundred parts of polymer. Lower concentrations of from about 0.1 to 1 parts per hundred parts of polymer are useful for direct blending of low concentration materials such as colorants. Higher concentrations of from greater than about 10 parts of material can be directly introduced into the polymer. High concentrations of from about 10 to about 50 parts of material per hundred parts of polymer are useful to make masterbatches such as color concentrates for introduction into larger quantities of the same or different polymers.

The dispersion aids of the present invention can be used with a wide variety of diverse polymers. The polymers can be polyolefins, such as polypropylene, or styrene based polymers, such as polystyrene. The dispersion aids of the present invention can also be used with the polymers which include but are not limited to polyamides, polyesters, ABS (copolymers of acrylonitrile, butadiene and styrene), polyethylene, polypropylene, other polyolefins and polycarbonates, polyethylene terephthalate, polybutylene terephthalate, and phenolic resins. Polymer compositions can include up to about 10 parts, preferably up to 5 parts and most preferably from 1.0 to 3.5 parts, of the dispersion aids per hundred parts of the polymer of the present invention.

The polymer salt dispersion aid of the present invention can be made by any means to make low molecular weight copolymer acid ionic salts known in the art. It is preferred to prepare the polymer salts of the present invention by the method described in U.S. Pat. No. 4,381,376 "Preparation of Low Molecular Weight Copolymer Salts", now U.S. Pat. No. 4,381,376, incorporated herein by reference. In summary, the copolymer acid and the cation containing material are fed to a reaction vessel. During the reaction, the reaction vessel is maintained below atmospheric pressure for at least a portion of the time, so that the oxygen content of the reaction vessel is minimized and volatile reaction products are removed. The reacting mixture is continually stirred or mixed within the reaction vessel. The temperature within the reaction vessel is controlled and maintained above the melting point of the polymer.

The dispersion aids of the present invention exhibit excellent thermal stability and can be used in a wide variety of diverse polymers as noted above. The dispersion aids of the present invention do not volatilize or discolor during processng. Compatibility, by definition, is the ability of two or more constituents to mix and remain homogeneously dispersed in one another. Physical compatibility depends on process conditions and physical properties of the dispersion aid and the polymer. The compatibility of the dispersion aid and the polymer is related to the physical properties of the dispersion aid such as viscosity and hardness of the copolymer salt which are related to molecular weight. Chemical compatibility is also important. The chemical compatibility is based upon chemical structure and interaction of constituents, such as the degree of solubility between the melted copolymer salt and polymer melt. A more compatible dispersion aid and polymer result in a more uniform dispersion.

Figure 2:
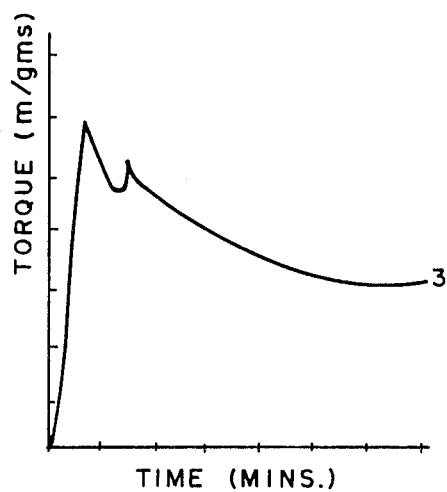

One measure of compatibility of the dispersion aid and the polymer is the fusion time. FIGS. 1 and 2 illustrate schematic curves of torque versus processing time typically encountered for a Brabender Mixing Bowl. Curve 1 is for a polymer containing no additives. Curve 2 is for the same polymer containing an additive which is compatible with the polymer and causes internal lubrication of the polymer. The additive and polymer are compatible and the amount of torque necessary to process a given amount of polymer in a given time is decreased.

If the melting point or the viscosity of the dispersion aid are too low, the dispersion aid becomes incompatible with the polymer and causes overlubrication. In an extruder such overlubrication occurs in the feed and transition zone of the extruder. Overlubrication is illustrated in Curve 3 of FIG. 2. The time between the two peaks of Curve 3 is the time during which the dispersion aid has very low viscosity or has melted before the polymer and is incompatible. This time is called the fusion time. The second peak along the axis is when the polymer melts and the overlubrication condition ceases.

During the fusion time, the system is over-lubricated. Although the torque decreases, no processing is taking place. At this time, the polymer blend is exposed to the high temperature in the processing equipment. Delays in fusion time, using the Brabender Mixing Bowl, in excess of 45 seconds indicate decreased mixing efficiency when using extrusion equipment, poor pigment dispersion, decreased output, and poor overall product quality.

In addition to compatibility, the melting point of the dispersion aid, is also an important consideration. For maximum dispersion, the melting point of the dispersion aid should be as low as possible without overlubricating. The dispersion aid generally melts prior to the polymer in which finely divided material is to be dispersed. The dispersion aid wets the material and pulls the material along with it as it flows through the resin.

The present invention includes a method of processing polymers to assure maximum dispersion of finally divided inert material. The polymer, dispersion aid and material to be dispersed are first intimately mixed. The dispersion aid and polymer can be in powder, pellet or chip form and the material to be dispersed is preferably in powder form. The mixture is then fed to a means to melt blend it at a temperature above the melting point of the polymer and the dispersion aid. Alternately, the dispersion aid and the material to be dispersed can be intimately mixed. The mixture of the dispersion aid and the material to be dispersed can then be mixed with the polymer and the final mixture melt blended. The melt blended dispersion aid and material to be dispersed can then be formed into pellets or other suitable shapes and intimately mixed or melt blended with the polymer. The melt blending means can include molding equipment, an extruder, mills, a mixing extruder or an internal mixer.

The dispersion aid of the present invention can be processed with polymers at temperatures from above the polymer melt temperature to about 400° C. The formed or mixed polymer product is then collected.

The examples set forth below illustrate the nature of the invention and the manner of carrying it out. However, the invention should not be considered as being limited to the details thereof.

EXAMPLES 1-8

Examples 1-8 illustrate the compatibility of the salt of copolymer acid B described in Table I, with high impact polystyrene. The polystyrene used was USS 610 TM high impact polystyrene, manufactured USS Chemicals Division, U.S. Steel Corporation, Pittsburgh, Pa. The polystyrene has a Melt Index of 2.0 and a VICAT Softening Point of 240° F. (96° C.) on ASTM D-1525.

The fusion time indicates the compatibility of the copolymer salt and the polymer, and the extrusion output rate in grams per 2 minutes, is indication of overlubrication caused by incompatibility as measured by fusion time, leading to external lubrication. The fusion time was measured using a Brabender Mixing Bowl, using a Brabender No. 6 mixing head at 190° C., 60 rpm with a 50 gram charge. The blends were extruded through a 1¼ inch Brabender extruder at 30 rpm. The temperature profile in the extruder was: Zone 1—170° C.; Zone 2—180° C.; Zone 3—190° C.; Zone 4—200° C.; and Zone 5—200° C. Comparative 1 is polystyrene containing no additive. Comparatives 2 and 3 are polystyrene containing unneutralized copolymer acid B from Table I. Examples 1-3 contain copolymer acid B 25% neutralized with Ca(OH)$_2$, (25% N-B), and Examples 4-8 contain copolymer acid B 50% neutralized with Ca(OH)$_2$, (50% N-B). Examples 1-8 are summarized in Table II with amounts of additive in pph (parts per hundred of polymer).

TABLE II

|  | pph Additive | Fusion Time (sec) | Extrusion Output grams/2 min. |
|---|---|---|---|
| Comp. 1 |  |  | 107 |
| Comp. 2 | 0.5 B | 90 | 58 |
| Comp. 3 | 1.0 B | 154 | 20 |
| Ex. 1 | 0.5 25% N-B | 15 | 112 |
| Ex. 2 | 1.0 25% N-B | 36 | 109 |
| Ex. 3 | 2.0 25% N-B | 48 | 96 |
| Ex. 4 | 0.5 50% N-B | 6 | 109 |
| Ex. 5 | 1.0 50% N-B | 10 | 112 |
| Ex. 6 | 2.0 50% N-B | 24 | 115 |
| Ex. 7 | 3.0 50% N-B | 38 | 109 |
| Ex. 8 | 4.0 50% N-B | 42 | 106 |

A review of Table II indicates that as much as 4.0 pph 50% neutralized copolymer acid B can be added and the fusion time and output are maintained at satisfactory levels.

EXAMPLES 9-17

The following are Examples of the two dominant physical properties, hardness and viscosity, relating to compatibility of the dispersion aid with polystyrene (PS) of the type described in Examples 1-8 and polypropylene (PP). The polypropylene is Pro-Fax ™ resin 6501, a homopolymer having a melt index of 4.0, which is manufactured by Hercules Inc. of Wilmington, Del. The dispersion aid of Comparative 4, 6 and 7 is copolymer acid B. The dispersion aid in Examples 9 and 10 is copolymer acid B, 25% neutralized with Ca(OH)$_2$, (25% N-B). The dispersion aid in Examples 11-17 is copolymer acid B, 50% neutralized with Ca(OH)$_2$, (50% N-B). Comparative 5 is the fusion time polypropylene without the dispersion aid. Examples 9-17 are summarized in Table III with amounts of additive in pph (part per hundred polymer).

TABLE III

| | Brookfield Viscosity @ 140° C. | Shore A Hardness | pph additive in PS | pph additive in PP | fusion time SEC |
|---|---|---|---|---|---|
| Comp. 4 | 660 | 81 | 1.0 B | — | 154 |
| Ex. 9 | 3,900 | 84 | 1.0 25% N-B | — | 36 |
| Ex. 10 | " | " | 2.0 25% N-B | — | 48 |
| Ex. 11 | 24,600 | 95 | 1.0 25% N-B | — | 6 |
| Ex. 12 | " | " | 2.0 50% N-B | — | 10 |
| Ex. 13 | " | " | 3.0 50% N-B | — | 24 |
| Ex. 14 | " | " | 4.0 50% N-B | — | 42 |
| Comp. 5 | — | — | — | — | 9 |
| Comp. 6 | 660 | 81 | — | 1.0 B | 18 |
| Comp. 7 | " | " | — | 2.0 B | 32 |
| Ex. 15 | 24,600 | 95 | — | 1.0 50% N-B | 9 |
| Ex. 16 | " | " | — | 2.0 50% N-B | 9 |
| Ex. 17 | " | " | — | 4.0 50% N-B | 14 |

A review of Table III shows that compatability improves with higher viscosity and hardness.

EXAMPLES 18-20

The dispersion aid of the present invention was evaluated in dry powder form. The dispersion aid and pigment were blended, using a high intensity Henschel blender at 1800 revolutions per minute (rpm) resulting in a free flowing powder. The finished form is a dustless powder containing the dispersion aid and pigment. Each mixture of dispersion aid and pigment was blended with high impact polystyrene blends of the type described in Examples 1-8. The mixture of dispersion aid and pigment were composed of equal parts per hundred of polymer, of dispersion aid and of pigment. The dispersion aid was copolymer acid B of Table I neutralized 50% with Ca(OH)$_2$. The pigments used were phthalocyanine blue-GT produced by the American Cyanamid Co., hereinafter phthalo blue, and phthalo blue plus titanium dioxide.

Each polystyrene blend was pelletized using a Brabender 1.25 inch single screw extruder. The extruder contained a single stage screw having a 3 to 1 compression ratio. The finished compounds were then injection molded, using a 1.0 oz. Battenfeld injection molder, into color chips. The temperature zones in the injection molder were Zone 1—180° ; Zone 2—190° C.; Zone 3—200° C.; and Zone 4—200° C. Each color chip was then evaluated for color intensity using an Applied Color Systems 500 Spectrophotometer. The Hunter 1958 method, Ll, al, bl color space, was used. The procedure generally follows the theory in Color and Color Related Properties, Pubs. No. 010/2, October, 1978-Al by Gardner Laboratory Division, P.O. Box 5728, 5521 Landy Ln., Bethesda, Md. 20014. The color intensity was measured under daylight conditions. The color intensity values for the intensity of blue are indicated as —b. The greater the —b value indicates a more intense blue color. The results of increased color development in high impact polystyrene resin using copolymer acid B of Table I neutralized 50% with Ca(OH)$_2$ as a dispersion aid are summarized in Table IV below. The amounts of dispersion aid are pph (parts per hundred of polymer).

TABLE IV

| | Comp. 8 | Ex. 18 | Comp. 9 | Ex. 19 | Comp. 10 | Ex. 20 |
|---|---|---|---|---|---|---|
| Polystyrene | 100 | 100 | 100 | 100 | 100 | 100 |
| Phthalo blue | .5 | .5 | 1.0 | 1.0 | .25 | .25 |
| TiO$_2$ | | | | | 1.0 | 1.0 |
| 50% N-B | — | .5 | — | 1.0 | — | 1.25 |
| Color Intensity | −21.72 | −23.13 | −18.46 | −21.37 | −32.72 | −35.77 |

The extrusion processing of the high impact polystyrene compounds was not impaired. This was not true when attempting to evaluate concentrates containing copolymer acid B. Dry concentrates containing pigment and equal amounts of copolymer B developed excessive lubrication during the extrusion and pelletizing stage. Compounds containing 0.5 pph pigment and 0.5 pph copolymer acid B had a reduction of greater than 65% output rate. Table IV indicates that the color intensity increased in each Example versus the corresponding Comparative.

EXAMPLES 21-22

High concentrations of powdered pigments in pelletized polystyrene of the type described in Examples 1-8 were evaluated. These compositions are useful as color concentrates for polystyrene compositions or in other polymers. The dispersion aid used was copolymer salt B neutralized 50% with Ca(OH)$_2$, and having an ASTM E-28 softening point of about 115° C.

The materials were charged into a Henschel high intensity blender at 1800 rpm. Heat was applied to the blend during blending. The temperature of the blends was increased to the softening point of the dispersion aid then discharged. The blends were then compounded into pellets, using a 1.25 inch Brabender extruder, containing a 4 to 1 compression ratio single stage screw. The temperature zones in the extruder were: Zone 1—180° C.; Zone 2—180° C.; Zone 3—200° C.; Zone 4—200° C.; and the die at 200° C. Table V summarizes the processing characteristics of concentrates in terms of meter grams (M grms). Amounts are percents by weight.

TABLE V

| | Comp. 11 | Comp. 12 | Ex. 21 | Comp. 13 | Ex. 22 |
|---|---|---|---|---|---|
| Polystyrene | 70 | 69 | 67 | 75 | 71 |
| Phathalo blue | 30 | 30 | 30 | 25 | 25 |
| Copolymer Acid B | — | 1 | — | — | — |
| 50% N-B | — | — | 3 | — | 4 |
| Avg Torque (Mgm) | 7800 | 6600 | 7500 | 8200 | 8500 |

As can be seen in Table V, the 30% pigment containing concentrate, with 1% copolymer acid B, has much greater effect on the processing (torque reduction) than a 3% addition of copolymer acid B 50% neutralized with Ca(OH)$_2$. The 4% copolymer acid B 50% neutralized with Ca(OH)$_2$ had no detrimental effect on processing. Visual observation of the pelletized concentrates showed the improvement of pigment dispersion developed by the use of the acrylic acid salts as a dispersion aid. Concentrates containing acrylic acid salts had a much more intense blue color compared to concentrates with-without. It could also be observed that fewer non-dispersed pigment particles were present in concentrates containing the acrylic acid salts.

EXAMPLE 23

Following is an Example of a preferred embodiment of the dispersion aid of the present invention. Copolymer acid B of Table I, having a molecular weight of below 5000 MWn, is 50% neutralized with calcium hydroxide by the method in U.S. Pat. No. 4,381,376 now U.S. Pat. No. 4,381,376. The dispersion aid has an average Brookfield viscosity of about 43,000 at 140° C.; an ASTM E-Z8 softening point of 105° C.; and ASTM D-5 hardness (Imn) of about 0.7; an ASTM D-1505 density of 0.93 gm/cc; an acid number of 40 mg of potassium hydroxide necessary to neutralize one gram of the disperion aid; and is white (clear).

EXAMPLES 24-27

This is an illustration of the dispersion aid of the present invention used in a composition to make polyamide fibers. The polyamide used was fiber grade polyepsiloncaprolactam (N6) having a formic acid viscosity (FAV) of 56. The polyamide was blended to form a concentrate with the dispersion aid of Example 23 and a pigment. The pigments used were: American Hoechst HS600 green dye lake; Ciba-Geigy Corp., Ciba no. 2732 yellow; Red 2B red pigment; and phthalo blue made by the Harmann Chemical Co. The concentrate was made by blending polyepsiloncaprolactam with equal amounts of the dispersion aid and pigments in a Baker-Perkins blender at 125° C. The amounts in weight percent of the polyepsiloncaprolactam (N6), pigment and dispersion aid used are summarized in Table VI.

TABLE VI

|  | Ex. 24 | Ex. 25 | Ex. 26 | Ex. 27 |
|---|---|---|---|---|
| N6 | 80 | 60 | 70 | 70 |
| Disper. Aid | 10 | 20 | 15 | 15 |
| Pigment | 10 (green) | 20 (yellow) | 15 (red) | 15 (blue) |

The mixture was then extruded through a 2½ inch single screw extruder at an average temperature of about 290° C. The concentrate was pelletized. The pellets of the concentrate of the polyepsiloncaprolactam, the dispersion aid and the pigment were bag blended with the polyepsiloncaprolactam (N6) to obtain the desired pigment level, and extruded through a 2 inch single screw extruder. The temperature profile throught the extruder was Zone 1—294° C.; Zone 2—275° C.; Zone 3—275° C.; and Zone 4—275° C. The extruder had a 14 hole spinnerite. The draw ratio was 3.2 and the pump size was 1.16. The fibers were spun to about 1100 denier fiber. Fourteen fiber strands came out of the die and were wound onto a spool. Five spools were then wound together to give a finished fiber of 70 strands. A control fiber which contained no additives was spun as Control 1, and a control fiber containing 0.25 parts of dispersion aid per hundred of polymer (pph) was spun as Control 2.

The concentrate of Example 24 was blended with additional polyepsiloncaprolactam until there was 0.15 pph pigment (Ex. 24A), and 0.50 pph pigment (Ex. 24B). The concentrate of Examples 25, 26 and 27 was blended with additional polyepsiloncaprolactam until there was 0.2 pph pigment. The dispersion aid of the present invention resulted in excellent dispersion of the pigment in the spun fibers in all examples. There was no strand breakage due to poor dispersion. The dispersion aid added gloss to the surface of the fiber. It was observed that the dispersion aids used helped the polyepsiloncaprolactam process more efficiently. The fibers had no breakage problems, good release from the spinnerites. Additionally, the composition had better flow properties than the control as indicated by lower pressures required during extrusion. Table VII below summarizes the physical property data of Controls 1 and 2 and Examples 24A, 24B, 25, 26 and 27. The stress-strain values were measured according to ASTM D-2256-80, using an Instron Machine at 0.5 cm/min. Break strength (grams), break elongation (%), tenacity (grams/denier), modulus (grams/denier) toughness (gram-cm/denier-cm) and load (grams) at 5% elongation (5E).

TABLE VII

|  | Denier | Brk. Str. | Brk. Elong. | Tenacity | Mod. | Toughness | Load @ 5E |
|---|---|---|---|---|---|---|---|
| Control 1 | 1136 | 4630 | 60 | 4.1 | 18.63 | 1.71 | 1096.23 |
| Control 2 | 1132 | 3834 | 64 | 3.4 | 16.87 | 1.56 | 999.15 |
| Ex. 24A | 1136 | 3910 | 65 | 3.4 | 16.08 | 1.60 | 969.37 |
| Ex. 24B | 1120 | 3788 | 63 | 3.4 | 16.07 | 1.54 | 928.55 |
| Ex. 25 | 1130 | 3999 | 67 | 3.5 | 17.02 | 1.73 | 1000.26 |
| Ex. 27 | 1122 | 3902 | 59 | 3.5 | 16.65 | 1.41 | 976.54 |

Generally, the use of the dispersion aid of the present invention causes a slight decrease in the physical properties. However, the dispersion of the pigments was so uniform that the addition of the pigment with the dispersion aid cause no further decrease in measured physical properties. Generally, poorly dispersed pigment reduces physical properties significantly.

EXAMPLE 28

Thermal stability becomes important as the dispersion aid is used and compounded into high temperature processing plastics, such as nylon, polyester, polycarbonate, etc. An indication of thermal stability is the performance of the additive during thermal gravimetric analysis (TGA) in air. T.G.A. evaluations, in air, were performed using a DuPont 951 Unit, at 10° C./min. heating rate, using a 30 mg sample. Copolymer acid B of Table I was run against copolymer acid B neutralized 50% with Ca(OH)$_2$. Table VI summarizes the percent weight loss at the measured temperatures.

TABLE VIII

|  | % Weight Loss at °C. | | | | | |
|---|---|---|---|---|---|---|
|  | 275 | 300 | 325 | 350 | 375 | 400 |
| Comparative | 1.9 | 4.0 | 9.5 | 20.0 | 60.7 | 61.5 |
| Example 28 | 0.8 | 1.1 | 1.8 | 2.5 | 4.2 | 10.0 |

The copolymer salt had increased thermal stability as measured by percent weight loss, and additionally retained a water white color at high temperatures.

While exemplary embodiments of the invention have been described, the true scope of the invention is to be determined from the following claims.

What is claimed is:

1. A composition comprising:
 a polymer selected from the group consisting of: polyolefins; styrene based polymers; polyamides; polyesters; polycarbonates; polyvinyl chloride; copolymers of acrylonitrile, butadiene, styrene; and phenolic resins; and up to 10 parts per hundred of the polymer of a dispersion aid which comprises a copolymer salt of a copolymer of an alpha-olefin and an alpha,beta-ethylenically unsaturated carboxylic acid, the copolymer acid having a number average molecular weight between about 500 and about 6,000, the copolymer acid being neutralized from 15 to 100% with at least one cation from the group consisting of metallic cations having a valence of 1 to 3; and from 0.1 to 100 parts per hundred of the polymer of a dispersible material.

2. The composition as recited in claim 1 wherein the polymer is selected from a group consisting of polypropylene and polystyrene.

3. The composition as recited in claim 1 wherein the alpha-olefin is ethylene.

4. The composition as recited in claim 2 wherein the cation is of a metal selected from the group consisting of Groups IA, IIA, IIIA zinc and the transition elements of the Periodic Table of Elements.

5. The composition as recited in claim 4 wherein the cation is selected from the group consisting of sodium, potassium, magnesium, calcium, barium, zinc and aluminum.

6. The composition as recited in claim 5 wherein the cations are supplied in the form of cation containing material selected from the group consisting of metal: oxides, hydroxides, oxylates, acetates, bicarbonates, methoxides and nitrates.

7. The composition as recited in claim 6 wherein the cation containing materials are selected from the group consisting of sodium hydroxide, magnesium oxide, calcium hydroxide, calcium acetate, zinc acetate and aluminum hydroxide.

8. The composition as recited in claim 1 wherein the alpha,beta-ethylenically unsaturated carboxylic acid has between 3 and 6 carbon atoms.

9. The composition as recited in claim 8 wherein the alpha,beta-ethylenically unsaturated carboxylic acid is acrylic acid.

10. The composition as recited in claim 9 wherein the copolymer is ethylene and acrylic acid having an acid number between about 40 and about 160.

11. The composition as recited in claim 10 wherein the copolymer of ethylene and acrylic acid is from about 15% to about 60% neutralized with the metal cation.

12. The composition as recited in claim 11 wherein the copolymer of ethylene and acrylic acid is from about 25% to about 60% neutralized with the metal cation.

13. The composition as recited in claim 11 wherein the cation is calcium.

14. The composition as recited in claim 13 wherein the cation containing material is calcium hydroxide.

15. The composition as recited in claim 9 wherein the viscosity of the copolymer salt is greater than 800 cps.

16. The composition as recited in claim 9 wherein the molecular weight of the copolymer acid is from about 1,000 to about 6,000.

17. The composition as recited in claim 16 wherein the molecular weight of the copolymer acid is from about 1,000 to about 3,500.

18. The composition as recited in claim 8 wherein the polymer is polystyrene and there is from 0.1 to 4.0 parts of the dispersion aid per 100 parts of polystyrene, the dispersion aid having a viscosity from about 30,000 cps to about 50,000 cps.

19. A method of processing polymers comprising the steps of: intimately mixing a dispersible material, the polymer and a dispersion aid, wherein the dispersion aid comprises a copolymer salt of a copolymer of an alpha-olefin and an alpha-beta-ethylenically unsaturated carboxylic acid, the copolymer acid having a number average molecular weight of between about 500 and about 6000, the copolymer acid being neutralized from 15 to 100% with at least one cation from the group consisting of metallic cations having a valence of 1 to 3; and melt blending the mixture.

20. A method of processing polymers comprising the steps of:
intimately mixing a dispersible material and a dispersion aid, wherein the dispersion aid comprises a copolymer salt of a copolymer of an alpha-olefin and an alpha,beta-ethylenically unsaturated carboxylic acid, the copolymer acid having a number average molecular weight between about 500 and about 6,000 the copolymer acid being neutralized from 15 to 100% with at least one cation from the group consisting of metallic cations having a valence of 1 to 3; and
melt blending the dispersible material and dispersion aid mixture with the polymer.

21. The method as recited in claim 20 further comprising the step of mixing the polymer and the mixture of the pigment and the dispersion aid prior to melt blending.

22. The method as recited in claim 20 wherein the mixture is melt blended in a temperature in the range from the melting point of the polymer up to 400° C.

23. The method as recited in claim 20 wherein the alpha-olefin is ethylene.

24. The method as recited in claim 23 wherein the cation is of a metal selected from the group consisting of Groups IA, IIA, IIIA and the transition elements of the Periodic Table of Elements.

25. The method as recited in claim 24 wherein the cation is selected from the group consisting of sodium, potassium, magnesium calcium, barium, zinc and aluminum.

26. The method as recited in claim 25 wherein the cation containing materials are selected from the group consisting of sodium hydroxide, magnesium oxide, calcium hydroxide, calcium acetate, zinc acetate and aluminum hydroxide.

27. The method as recited in claim 20 wherein the alpha,beta-ethylenically unsaturated carboxylic acid has between 3 and 6 carbon atoms.

28. The method as recited in claim 27 wherein the alpha,beta-ethylenically unsaturated carboxylic acid is the copolymer of ethylene and acrylic acid having an acid number between about 1 and about 180.

29. The method as recited in claim 28 wherein the copolymer of ethylene and acrylic acid has an acid number between about 40 and about 160.

30. The method as recited in claim 29 wherein the cation is calcium.

31. The method as recited in claim 30 wherein the cation supplying material is calcium hydroxide.

32. The method as recited in claim 28 wherein the Brookfield viscosity at 140° C. of the copolymer salt is from about 10,000 to 50,000 centerpoises.

33. The method as recited in claim 28 wherein the polymer is selected from the group consisting of: polyolefins; styrene based polymers; polyamides; polyesters;

polyvinyl chloride; copolymers of acrylonitrile, butadiene, and styrene; polycarbonates and phenolic resins.

34. The method as recited in claim 33 wherein the polymer is selected from a group consisting of polypropylene and polystyrene.

35. The method as recited in claim 28 wherein the molecular weight of the copolymer acid is from about 1,000 to about 6,000.

36. The method as recited in claim 35 wherein the molecular weight of the copolymer acid is from about 1,000 to about 3,500.

37. The method as recited in claim 28 wherein the copolymer acid is from 15% to 60% neutralized with the metal cation.

38. The method as recited in claim 37 wherein the copolymer acid is from 25% to 50% neutralized with the metal cation.

39. The composition as recited in claim 1 wherein the composition has a fusion time of less than 45 seconds.

40. The composition as recited in claim 1 wherein the dispersible material is a finely divided dispersible inert material.

41. The composition as recited in claim 1 wherein the polymer is a polyamide.

42. The composition as recited in claim 40 wherein the inert material is selected from the class of pigments, lake dyes and coal tar colors.

43. The composition as recited in claim 1 wherein the dispersible material is selected from the group consisting of inorganic, organic, natural and synthetic pigments; lake dyes; fillers; flame retarders; antioxidants; and stabilizers.

44. The method as recited in claim 20 wherein the dispersible material is a finely divided dispersible inert material.

45. The method as recited in claim 20 wherein the dispersible material is selected from the group consisting of inorganic, organic, natural and synthetic pigments, lake dyes; fillers, flame retarders; antioxidants; and stabilizers.

46. The composition as recited in claim 1 wherein there is from 0.1 to 10 parts per hundred of polymer of the dispersion aid.

* * * * *